United States Patent [19]
Haydu

[11] Patent Number: 5,113,320
[45] Date of Patent: May 12, 1992

[54] SPHERICALLY ADJUSTABLE HEADLAMP MOUNTING SYSTEM

[75] Inventor: Bartley A. Haydu, Anderson, Ind.

[73] Assignee: Robart Enterprises, Inc., Anderson, Ind.

[21] Appl. No.: 568,233

[22] Filed: Aug. 16, 1990

[51] Int. Cl.$^5$ ............................................. B60Q 1/06
[52] U.S. Cl. ......................................... 362/61; 362/66;
 362/80; 362/419; 362/429; 362/294; 362/373;
 362/345
[58] Field of Search ...................... 362/61, 80, 66, 250,
 362/269, 275, 283, 285, 287, 418, 419, 429, 430,
 96, 294, 373, 345

[56] References Cited

U.S. PATENT DOCUMENTS

| | | | |
|---|---|---|---|
| 1,124,902 | 1/1915 | Howe | 362/66 |
| 4,142,228 | 2/1979 | Kumagai et al. | 362/66 |
| 4,422,136 | 12/1983 | Newman et al. | 362/61 |
| 4,635,174 | 1/1987 | Montet | 362/61 |
| 4,675,792 | 6/1987 | Capellari et al. | 362/66 |
| 4,709,305 | 11/1987 | McMahan et al. | 362/61 |
| 4,722,029 | 1/1988 | Ahle et al. | 362/66 |
| 4,722,033 | 1/1988 | Van Duyn et al. | 362/427 |
| 4,747,023 | 5/1988 | Ball et al. | 362/269 |
| 4,827,388 | 5/1989 | Miyazawa | 362/61 |
| 4,882,658 | 11/1989 | Allen | 362/61 |
| 4,931,912 | 6/1990 | Kawakami et al. | 362/61 |

Primary Examiner—Ira S. Lazarus
Attorney, Agent, or Firm—Locke Reynolds

[57] ABSTRACT

A motor vehicle headlamp assembly includes a headlamp having a light source and a reflector. A lens is bonded or otherwise fixed to the perimeter of the reflector. A surface is provided having a common radius centered on a point situated forward of the reflector which defines a segment of a first spherical surface. A fixture adapted to be mounted to a motor vehicle includes a similar spherical surface adapted to nest with the first spherical surface. The surface of the fixture and the surface of the headlamp are adjustable with respect to each other to permit alignment of light emitted from the light source to a selected direction. A fastener passes through a spherical washer and an opening in the fixture and is spherically movable within the opening over a range of positions to permit alignment of the headlamp with respect to the fixture.

The first spherical surface can be provided on a rear surface of the housing or on a housing bracket coupled to the housing. The housing including the interior reflective surface can be formed in a unitary molded body which includes a plurality of vent openings and integral vent channels extending rearwardly from the vent openings. One or more walls forming the channels can be provided by a portion of the housing bracket which is coupled to the housing. The housing bracket can include forwardly extending legs for coupling the lens to the perimeter edge of the housing. The housing bracket can also include features for receiving the illuminating source in locking engagement.

40 Claims, 5 Drawing Sheets

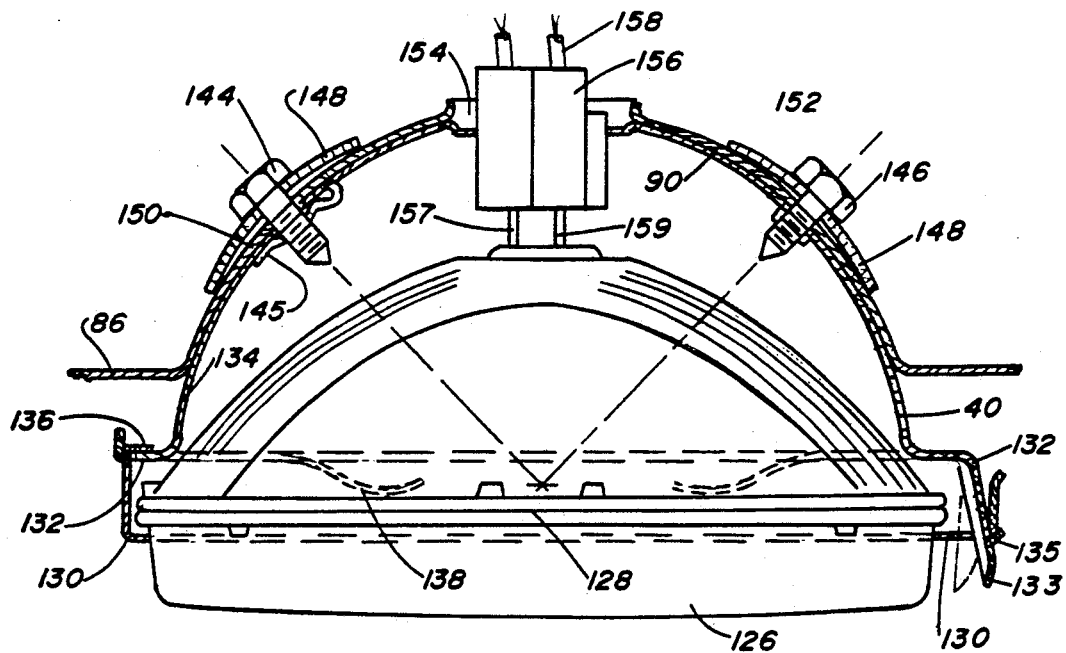
FIG. 7
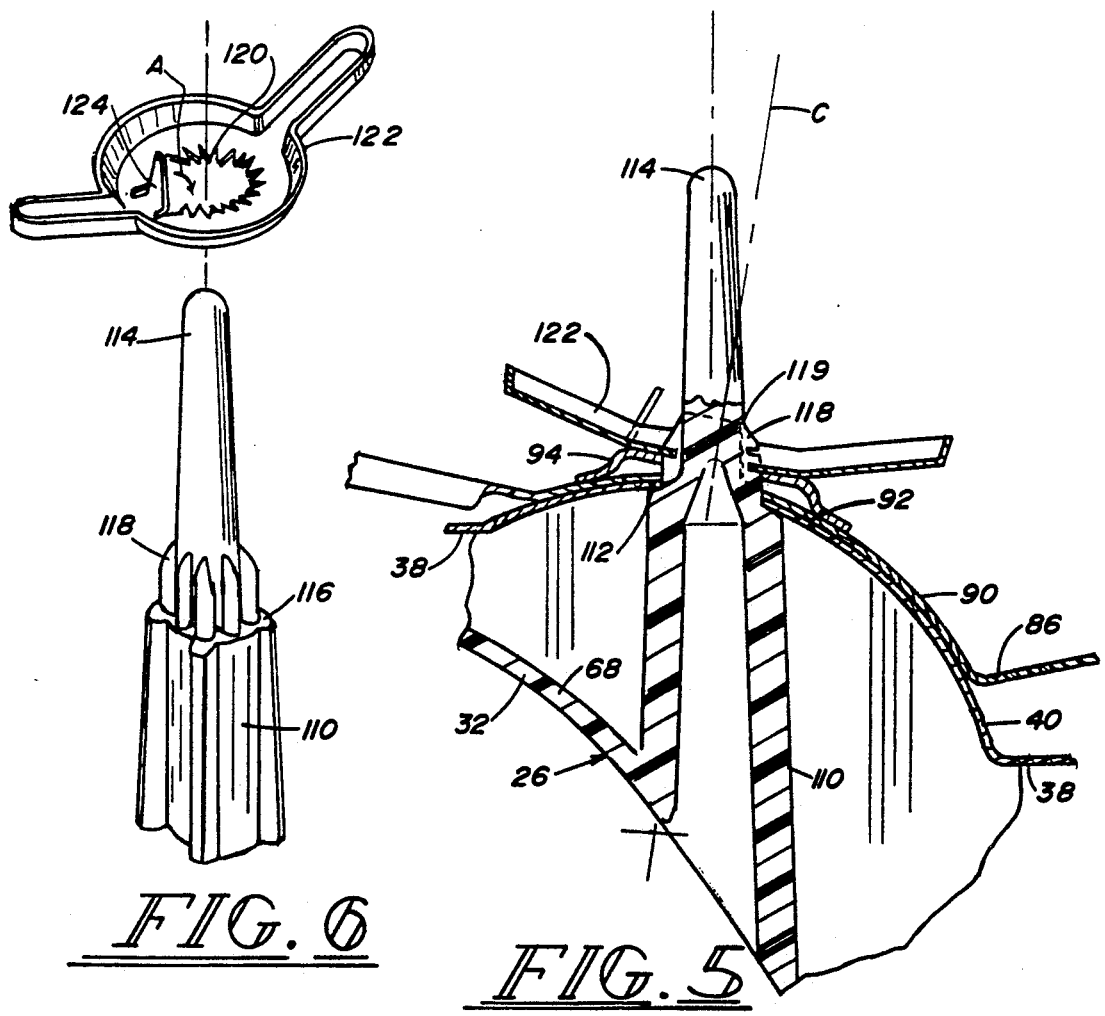
FIG. 6
FIG. 5

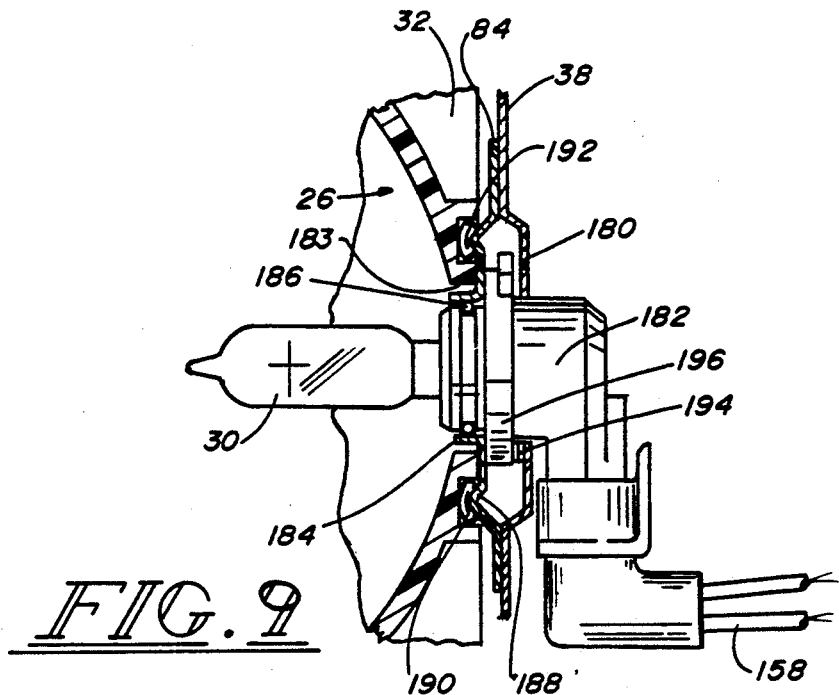
FIG. 9
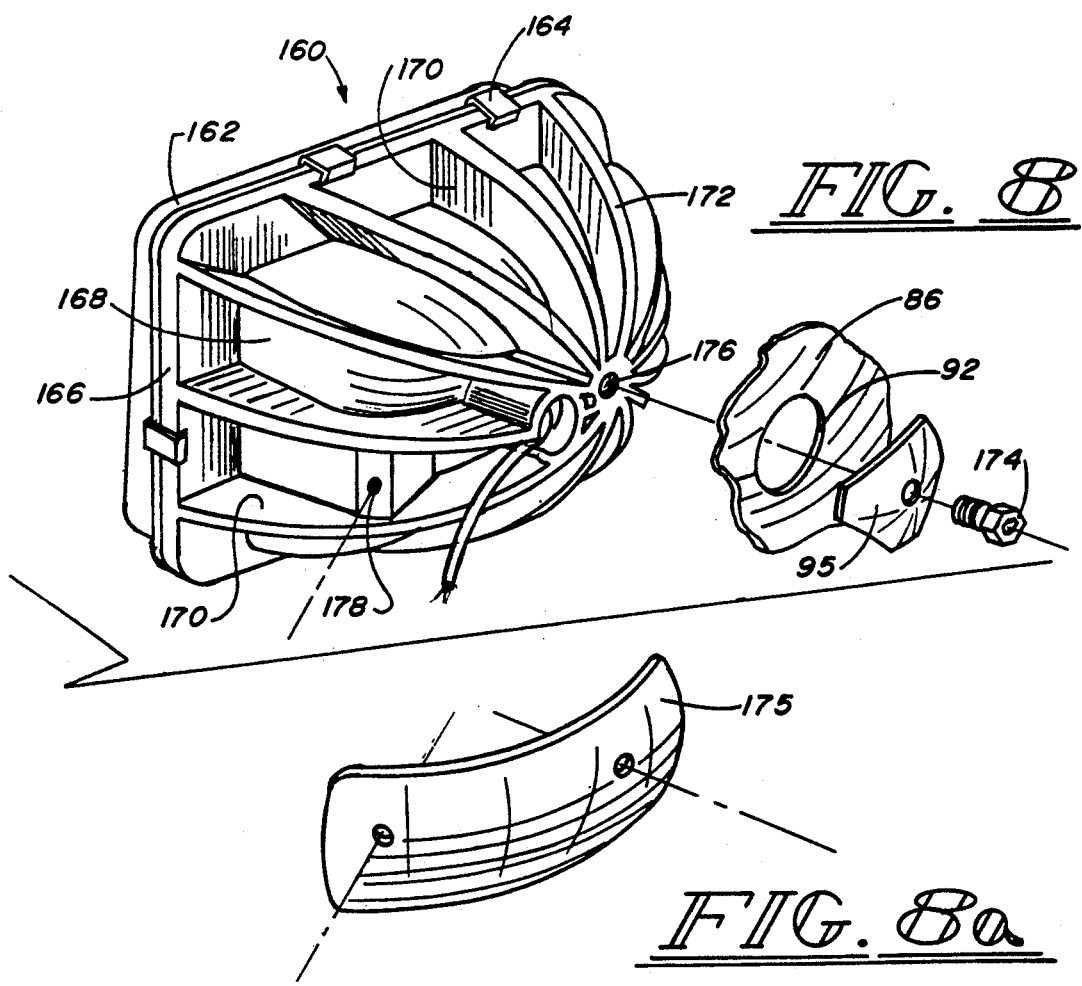
FIG. 8
FIG. 8a

SPHERICALLY ADJUSTABLE HEADLAMP MOUNTING SYSTEM

BACKGROUND OF THE INVENTION

This invention concerns headlamps for motor vehicles including mounting systems for headlamps which permit adjustment in the horizontal and vertical directions for alignment of the headlamp.

Motor vehicles, including cars, trucks, and the like, are generally required to have headlamps for illuminating the road or path ahead of the motor vehicle during night travel. While it is generally desirable to provide motor vehicles with headlamps providing as much illumination as possible, safety concerns require that the illumination provided by a headlamp be controllable, at least in certain circumstances. For example, as a matter of safety to drivers of other motor vehicles which may be approaching on the same road, headlamps are required to have a "low" or "dim" setting which can be triggered either automatically or by a driver. Generally, a "low" or "dim" setting is one in which the beam of light emitted from the headlamp is directed somewhat below the horizontal and to the passenger side of the road, while a "high" or "bright" setting is one in which the beam of light is directed horizontally and straight ahead of the vehicle. Over the years, certain standards have been developed in various countries relating to the amount and direction of illumination in the presence of oncoming motor vehicles. These requirements have in turn been translated into certain requirements for lenses, reflectors, shields, and the like, all of which are well known to those skilled in the art. The term "headlight" is used herein to refer to the combination of a light source, a reflector reflecting light from the source and a lens through which the light passes, whether unitary or composite in structure. The term "headlamp" is used herein to refer to the combination of a headlight together with such supporting structure as is necessary to mount the headlight to a motor vehicle.

An aspect of the control of the illumination from a headlamp requires that the headlight be mounted to the motor vehicle in an adjustable manner such that the direction of the light emitted from the headlight can be adjusted to comply with the various regulations. A wide variety of headlight mounting schemes are known which include some adjustment feature. Typically, the mounting system employs a gimbal-like arrangement wherein a headlight is adjustable with respect to the body of the vehicle about two axes which may, but need not be, orthogonal to each other through various adjustment means. The adjusting means typically are in the form of a threaded rod or screw and appropriate follower providing for back and forth adjustment on each axis upon rotation or counter rotation of the threaded member. Such rotation or counter rotation may be caused directly with the use of a screwdriver or more indirectly through meshed gear transmission elements, rack and pinion connections, or other functionally similar operating means.

The alignment mechanisms in headlamp assemblies, particularly those involving a plurality of illumination sources, have in recent years become increasingly complex with headlamp assemblies often having nearly 75 parts and a replacement cost exceeding $125.-. Accordingly, an object of the present invention is to provide a motor vehicle headlamp assembly which avoids undue complexity and provides for a very simple adjustment of the alignment of the headlight with respect to the motor vehicle.

The headlamps employed in motor vehicles have themselves gone through considerable evolution. Initially, headlights were constructed with a housing which included a reflector directing light in a forward direction. A lens was provided usually incorporating one or more focusing elements to direct light in a preselected direction. The source of light was generally a replaceable element of one design or another. As designs progressed, these elements eventually became to be built as a single unitary sealed beam. Until recently, such sealed beam lights held a dominant position in the industry and will continue to play an important role in certain situations. It is therefore one object of the present invention to provide a mounting system for such sealed beam lights which will permit quick replacement of the light and quick alignment of the lamp.

In the very recent years, a trend away from sealed beam headlamps to both single and multiple source composite headlamps has occurred. The new composite headlamps, while considerably improved over the very early headlamps, encountered some of the same problems earlier experienced with the respect to the control of dust and moisture. Elaborate, separate systems have been developed in order to control the internal environment within the composite headlamp yet allow for the necessary venting. Accordingly, another object of the present invention is to provide a new headlamp assembly which integrally includes the required controlled venting features.

As indicated previously, composite lamp assemblies incorporate a light source which itself is removable from the reflector housing. Various means have been provided for retaining the light source within the composite headlamp. Typically, light source retaining means include separate elements fixed to an appropriate outer surface of the reflector. Such separate elements again contribute to the need for a large variety of separately manufactured parts thereby contributing to increased cost. Accordingly, it is yet another object of the present invention to provide a light source mounting arrangement which can be integral with a portion of the alignment apparatus thereby diminishing the need for separate fabricated elements.

SUMMARY OF THE INVENTION

In accordance with the present invention, a motor vehicle headlamp assembly includes a headlamp having a light source and a reflector which has an edge which defines the perimeter of the headlight. The headlight can be provided with a lens which may be bonded or otherwise fixed to the perimeter of the reflector. A surface defining means is fixed to a rear surface of the headlight to define a set of points having a common radius centered on a point situated forward of the reflector. Such set of points defines a segment of a first spherical surface. A fixture adapted to be mounted to a motor vehicle includes a similar spherical surface adapted to nest with the first spherical surface. The first spherical surface and the surface of the fixture of the headlamp are adjustable with respect to each other to permit alignment of light emitted from the light source to a selected direction. A fixing means such as a screw passes through an opening in the fixture but is spherically movable in a compound direction within the opening over a range of positions. The screw is provided with a large spherical washer whereby the fixing means can fix the position of the headlight with respect to the fixture.

The first spherical surface can be provided on a housing bracket coupled to the housing of the headlamp. The housing bracket can include forwardly extending coupling means for coupling the lens to the perimeter edge of the housing. The housing bracket can also include means for receiving the illuminating source in locking engagement. The housing including the interior reflective surface can be formed in a unitary molded body which includes a plurality of vent openings and integral vent channels extending rearwardly from the vent openings. One or more walls forming the channels can be provided by a portion of the housing bracket which is coupled to the housing. The term "vent" is used herein to mean an opening which permits the passage of air and/or moisture in both gas and liquid form, and to include the concept of a drain.

One feature of the present invention is the use of a pair of nested spherical surface segments to provide for cooperative movement between a headlight and a fixture in which the headlight is mounted. One of the spherical surfaces includes an opening of sufficient size which surrounds a fastener for permitting spherical adjustment in the direction of the headlight with respect to the supporting fixture. The nesting surfaces are then cooperatively locked at the desired position by means of the fastener which passes through a spherical washer into the opening. This has the advantage of bringing together both the aligning and locking functions of the assembly thereby diminishing the number of parts required and permitting the overall assembly to be produced at lower cost. This has the additional advantage of permitting a quick alignment of the headlamp achieved through a movement in a compound direction within the limits permitted by the spherical surface opening. Additionally, the headlight can be centered in the available space between the grille, hood, fender, and bumper or other adjacent body parts of the motor vehicle, and then secured in the desired position by tightening the one fastener.

Another feature of the present invention is the use in a composite lamp of a molded housing including a parabolic reflector on the interior of that housing and a plurality of openings providing for venting and draining of the composite lamp. The molded housing includes integral channel formations which have the advantage of eliminating the necessity of separate assembly of tubes, or the like, commonly used in the prior art to control environmental access to the headlamp interior.

Yet another feature of the present invention is incorporation of a headlamp housing bracket which is coupled to the housing integrally including means surrounding an opening in the housing for lockingly receiving a source of an illumination therein. Again, such integral accommodation of the illumination source by the housing bracket diminishes the overall number of parts required thereby diminishing overall costs.

Additional features and advantages of the present invention will become apparent to those skilled in the art upon consideration of the following detailed description of preferred embodiments exemplifying the best mode of carrying out the invention as presently perceived. The detailed description particularly refers to the accompanying drawings.

BRIEF DESCRIPTION OF THE DRAWINGS

FIG. 5 is a sectional detail view of an alternative fastening means for engaging the nesting spherical surfaces of the housing bracket and mounting bracket.

FIG. 6 is an exploded perspective view of the alternative fastening means shown in FIG. 5.

FIG. 7 is a sectional view of a motor vehicle headlamp assembly which receives a sealed light capsule and incorporates the alignment adjusting features of the present invention.

FIG. 8 is an oblique perspective view of a single cavity headlamp in which the housing includes a plurality of ribs integrally defining a spherical surface together with a portion of a fixture adapted to be mounted to a motor vehicle.

FIG. 8a is an oblique perspective view of an alternate washer which can be used in the embodiment shown in FIG. 8 and elsewhere.

FIG. 9 is a sectional detailed view of a housing bracket including an illumination source receiving feature.

DESCRIPTION OF THE PREFERRED EMBODIMENTS

Figure 1:
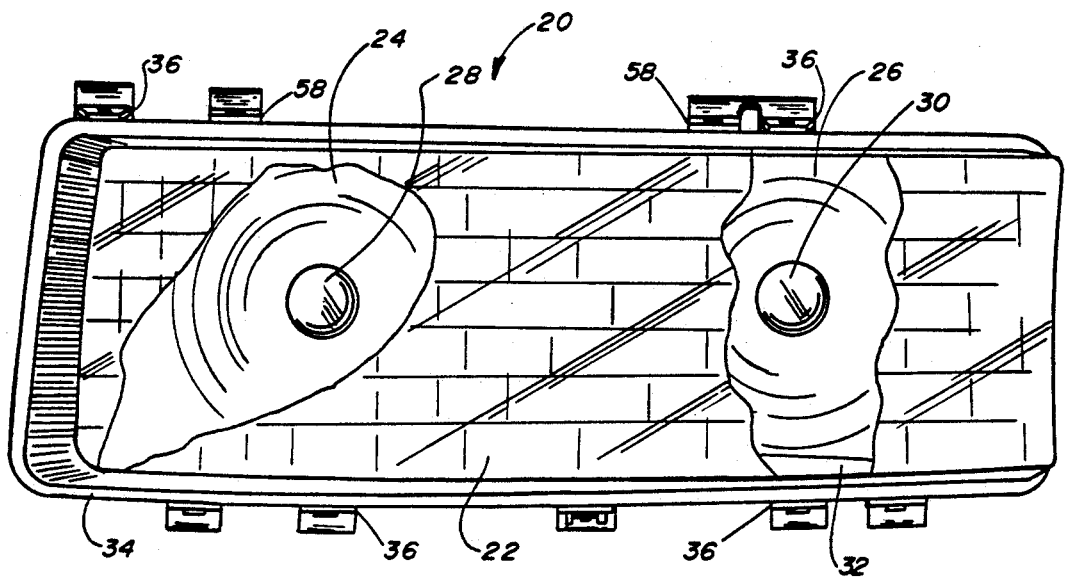
FIG. 1 is a front elevation view of a headlamp assembly in accordance with the present invention with the lens partially broken away to reveal the illumination sources and reflector.

A motor vehicle headlamp assembly 20 in accordance with the present invention is shown in FIG. 1 to include a lens 22 which has been partially broken away to reveal two reflective surfaces 24 and 26 which surround a pair of independent light sources or bulbs 28 and 30 forming, respectively, the "high" and "low" beams. The reflective surfaces 24 and 26 generally comprise an aluminized coating on an interior surface of a unitary housing 32. The lens 22 is joined to the housing 32 at a perimeter edge 34 employing conventional sealants or gasketing materials, and is held in place by a series of clips or hooks 36 which are an integral portion of a housing bracket 38 as shown in FIG. 2.

Figure 2:
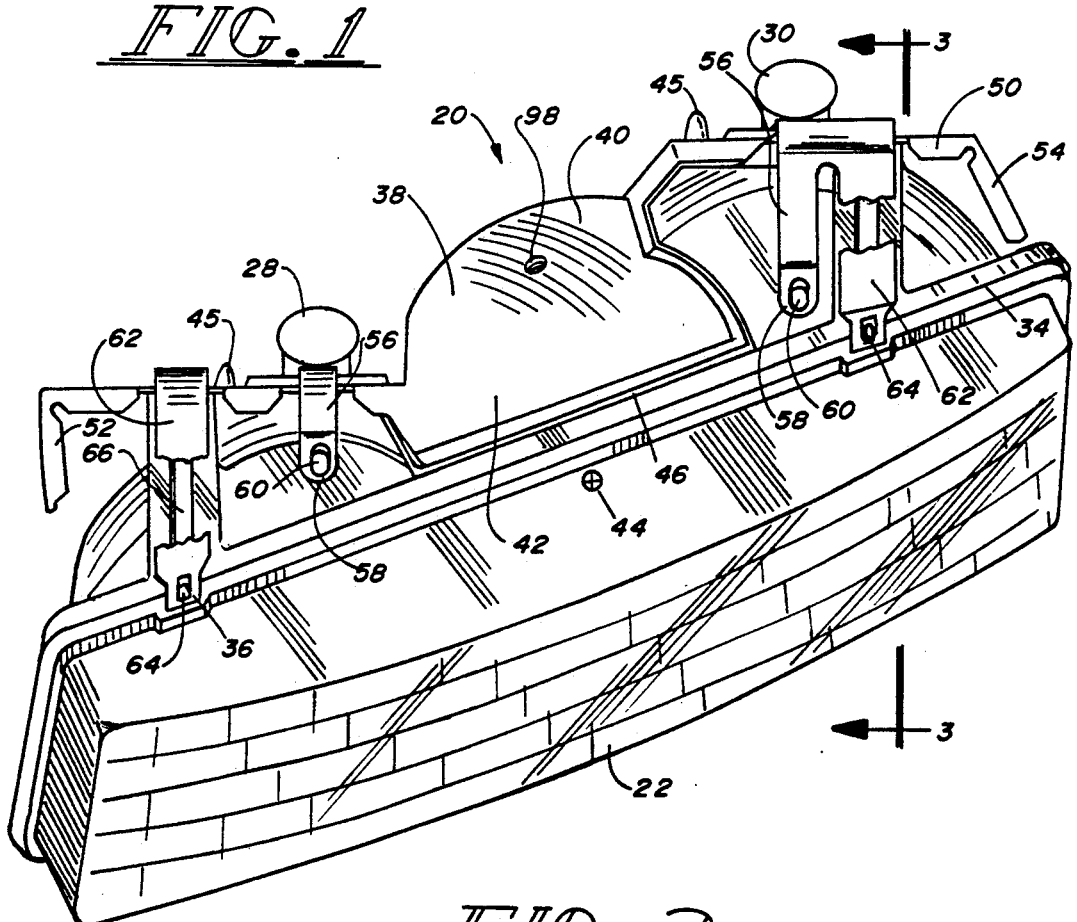
FIG. 2 is a top plan view of the headlamp assembly shown in FIG. 1 including a housing bracket partially broken away to reveal the integral venting channels.

The housing bracket 38 is shown in FIG. 2 to consist of a stamped metal element having a central portion 42 having a rearwardly directed outer surface 40 configured to define a spherical segment having a defining radius centered at a point 44 within the headlamp forward of the reflective surfaces. The housing 32 includes a plurality of locating pins 45 which are received in aperatures (not shown) in the housing bracket 38 to correctly position the housing bracket with respect to the housing 32. The housing bracket 38 includes a forward edge 46 which contacts a rear surface 33 of the perimeter edge 34 of the housing 32 to ensure further the correct positioning of the housing bracket 38.

Figure 4:
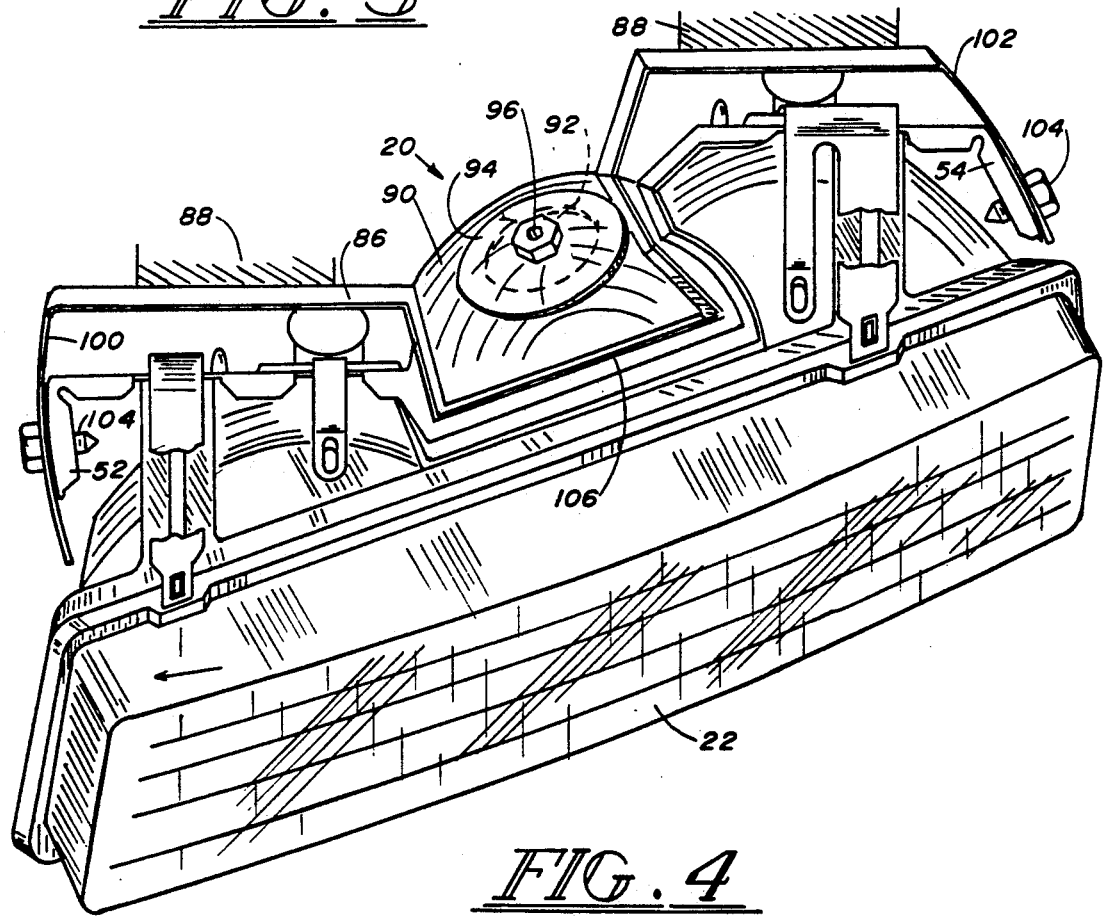
FIG. 4 is a top plan view similar to FIG. 2 but including a mounting bracket adapted to be mounted to motor vehicle in which the headlamp assembly is to be installed.

The housing bracket 38 also includes a pair of laterally extending portions 48 and 50 including outer flanges 52 and 54, respectively, the function of which will become apparent from the discussion of FIG. 4. The housing bracket 38 also includes a plurality of forwardly extending legs 56 including housing engaging means 58 in the form of a slot, tab, hook, or similar feature engaging a hook 60 which is integral with an outer surface of the housing 32.

The housing bracket 38 further includes a second set of forwardly extending legs 62 which include at their forward edge lens engaging means in the form of clips 36 which engage hooks 64 on the perimeter of lens 22. The forwardly extending legs 62 are configured to overlie and form the outer wall of upper venting channels 66 which are integrally formed in the housing 32 and more clearly illustrated in FIG. 3.

Figure 3:
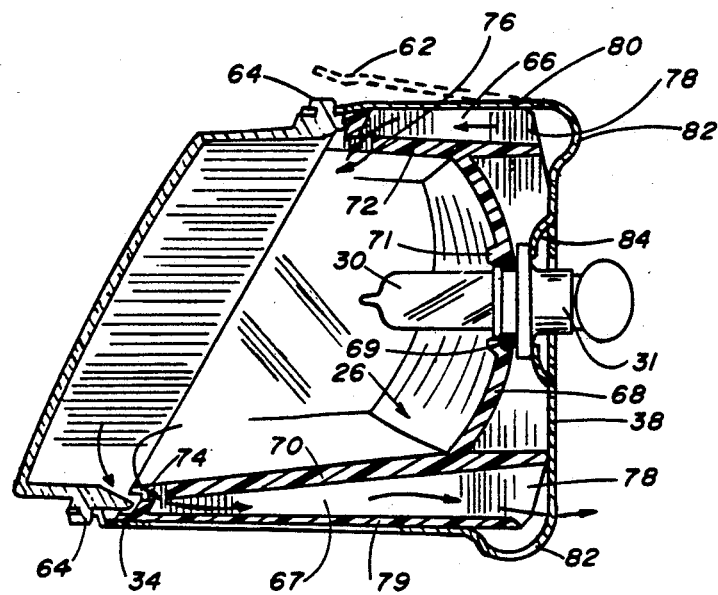
FIG. 3 is a sectional view of the headlamp shown in FIG. 2 taken along line 3—3 revealing both the upper and lower venting channels.

In FIG. 3, it will be seen that the housing 32 which includes the internal reflective surface 26 has a rear wall 68 which is generally parabolic in form. The rear wall includes an opening surrounded by flange 71 for snugly receiving and positioning bulb 30 held by socket 31 including O-ring 69. The light source 30 can be retained therein by a bulb retaining means such as flange 84 operating in a conventional 60° turn to lock engagement with the bulb socket. Various embodiments of other novel bulb retaining means 84 are illustrated further in FIGS. 9-13 of the present application.

Bottom and top walls 70 and 72 extend forward from the rear wall to the perimeter edge 34 where the housing 32 mates with lens 22. Both the lens 22 and the housing 32 are configured to allow their manufacture using standard injection molding techniques and without requiring the use of any slides in either the mold core or cavity. The walls 70 and 72 have openings 74 at their forward edge adjacent to perimeter 34 and 76, respectively, which lead to upper and lower venting channels 66 and 67. The venting channels 66 and 67 are unitarily formed with the housing and are defined by walls 70 and 72 as well as outwardly extending channel side walls 78.

The outer edge 80 of the side walls of upper channel 66 are shown to be generally planar and are configured to mate with forwardly extending legs 62 of the housing bracket 38 to define an enclosed channel for receiving and relieving air from the housing 32. The legs 62 of the housing bracket 38 are preferably formed with a slight outward bend as shown in phantom so as to lie flat against the planar outer edges 80 of the channel side walls. The lower venting channel 67 further includes an outer wall 79 unitarily formed with the housing 32. It will be noted that vent opening 74 leading to lower venting channel 67 is situated substantially at the lower most point in the lamp and thus operates as a drain for any moisture which may accumulate within the lamp.

The forwardly extending legs 62 of the housing bracket 38 each include a length adjusting means in the form of outwardly extending bubbles 82 which are integral with each leg and adapted to be displaced toward the housing 32 to adjust the length of the leg 62 so as to permit engagement and disengagement of the hooks 64 coupling the lens 22 to the housing 32. It will be appreciated that the bubble 82 performs an essentially spring-like function and may be modified by adjusting the radius of curvature so as to finely tune the positioning of the lens engaging forward portion of each leg. The spring-like function of the bubbles 82 also ensures that the housing bracket is securely held against the rear surface of the lamp housing 32. The bubbles can be positioned as necessary to avoid interference with adjacent body parts of the vehicle in which the assembly is installed.

A headlamp assembly 20 in accordance with the present invention additionally includes a mounting bracket 86 such as is shown in FIG. 4. The mounting bracket 86 is adapted to be mounted to the motor vehicle through flanges or other features 88. The details of construction of features 88 are largely specified by structural considerations of the manufacturer of the motor vehicle in which the headlamp assembly is to be installed and form no part of the present invention.

The mounting bracket 86 includes a central portion including an interior spherical surface 90 which overlies and nests with spherical outer surface 40 of the housing bracket shown in detail in FIG. 2. The central portion 90 includes an aperture 92 shown in phantom which is covered by a spherical washer 94 and retained in place by a fastener 96 passing through the opening 92 to engage the threaded hole 98 shown in FIG. 2. The mounting bracket 86 also includes outer flanges 100 and 102 which are coupled to housing bracket flanges 52 and 54 respectively by means of additional threaded fasteners 104. The edges 106 of central portion 90 are generally spaced from the edges 108 of housing bracket central portion 40 by a distance sufficient to permit relative adjustment between central portions 40 and 90 of the housing bracket and mounting bracket respectively.

Adjustment of the alignment of the lamp with respect to the motor vehicle is achieved by loosening fasteners 96 and 104. The lamp is then manipulated to point in the desired direction while the nesting spherical surfaces of central portions 90 and 40 move with respect to each other. Once the desired alignment is achieved, fastener 96 is tightened to prevent further movement between the nested spherical surfaces. No further tightening is necessary to achieve alignment. The fasteners 104 can be tightened to reduce the likelihood of subsequent misalignment through vibration, shock, and the like. It is, however, to be understood that fasteners 104 perform no function in the alignment process itself, and flanges 52, 54, 100, and 102 are optional and need not be provided if sufficient locking can be achieved between the nested surfaces 40 and 90.

While FIGS. 2 and 4 contemplate the use of a threaded fastener 96, alternative means can be employed for aiding in the alignment of the headlamp assembly such as that illustrated in FIGS. 5 and 6 wherein a rearwardly projecting member 110 integrally formed with the rear wall 68 of housing 32 protrudes through a small opening 112 in housing bracket 38 and through the much larger opening 92 in mounting bracket 86. The rearwardly projecting member 110 terminates in an integral handle portion 114 which can be used to manipulate the alignment of the housing 32 and housing bracket 38 with respect to the mounting bracket 86. The rearward projecting member 110 is shown in FIG. 6 to include a first stop 116 against which the inner surface of central portion 40 of the housing bracket 38 rests. A plurality of flutes 118 extend above the stop 116 and are adapted to be engaged by and cut by teeth 120 found on wing nut fastener 122. The upper ends 119 of the flutes 118 are inclined somewhat to ensure that the wing nut 122 engages the flutes at an angle shown by center line C and therefore cause an even pressure on washer 94.

With the wing nut 122 in a loosened position, the nesting surfaces of central portions 40 and 90 of housing bracket 38 and mounting bracket 86 are free to slidably move with respect to each other. One desiring to align the headlamp assembly can do so by grasping and manipulating handle portion 114 of the rearwardly projecting member 110. Once the desired alignment is achieved, the wing nut 122 can be rotated to engage and cut flutes 118 thereby tightening down on washer 94 which in turn compresses the nesting spherical surfaces of central portions 40 and 90 together to prevent further relative movement therebetween. Tab 124 on wing nut 122 can then be moved from its upwardly projecting position shown in FIG. 6 in full, and in FIG. 5 in phantom, in the direction of arrow A to the position shown in full in FIG. 5 between an adjacent pair of flutes 118 thereby preventing any further movement of wing nut 122. Again, it will be appreciated that it may be desirable, although not necessary, to provide vibration reducing coupling means such as fasteners 104 illustrated previously in FIG. 4.

Alternatively, a plurality of fasteners can be employed to penetrate the nesting spherical portions of the surfaces 40 and 90 as shown in FIG. 7. There, a sealed light capsule 126, also referred to as a sealed beam light, includes a peripheral edge 128 which is surrounded and captured on the forward surface of peripheral edge by an aiming and clamping ring 130. The capsule housing includes a plurality of spring fingers 138, shown in phantom, which contact a rear surface of peripheral edge 128 to bias the sealed capsule 126 toward ring 130. The ring 130 is joined to a forward lip 132 of capsule housing 134 by tabs 136 forming a hinge. The ring 130 is also joined to lip 132 by projecting tabs 133 being received through openings in ring 130 sufficiently far against the force of spring fingers 138 to permit engagement of catch 135 against a forward edge of ring 130.

The capsule housing 134 includes a spherical outer surface 40 which is nested into the spherical inner surface 90 of mounting bracket 86. A pair of spaced pierced openings 140 and 142 are provided in capsule housing 134 which receive threaded fasteners 144 and 146, respectively. It will be noted that while fastener 146 engages the edge of pierced opening 142, fastener 144 engages a nut 145 stamp-formed from a portion of surface 40 to include a key-hole shaped opening and folded as shown inside of surface 40 in approximate alignment with another key-hole shaped opening in surface 40. The threaded fasteners pass through spherical washers 148, having a radius less than the radius of the nested surfaces 40 and 90, which contact the outer surface of mounting bracket 86 and extend outside the perimeter of openings 150 and 152 in the mounting bracket 86. A central opening 154 is provided to permit the electrical plug 156 and associated wires 158 to engage the electrical prongs 157 and 159 on the back of the sealed capsule 126.

Alignment of the light capsule 126 is accomplished by loosening both fasteners 144 and 146 so as to permit the nested spherical surfaces 40 and 90 of capsule housing 134 and mounting bracket 86 to slide relative to one another. The sealed capsule 126 is manually aligned to the desired direction and one of the fasteners 144 or 146 is tightened. While the frictional force between the two nested spherical surfaces provided by the tightened single fastener is generally sufficient to maintain the alignment of the sealed capsule 126, the second fastener is thereafter tightened to further ensure that sealed capsule 126 will not become later misaligned due to road shock, vibration, or the like.

While the embodiments shown in FIGS. 1-7 have incorporated a housing bracket 38 or capsule housing 134 to provide one of the two nested spherical surfaces, it is also possible to provide such a spherical surface by integrally molding the same on the back surface of a composite lamp housing as shown in FIG. 8. There, a composite headlamp assembly 160 includes a lens 162 joined by clips or other fastening means 164 to the perimeter edge 166 of a unitary molded housing 168. The housing integrally includes a plurality of fins or webs 170 each of which includes an arcuate outer surface 172. The arcuate surfaces 172 taken together define a spherical outer surface for the housing 168. A mounting bracket 86 including a spherical central portion 90 can receive the plurality of webs 170 in a nesting relationship similar to that previously described and illustrated. A fastener 174 which is shown to include both male and female drive capability passes through triangular spherical washer 95 and opening 92 in mounting bracket 86 to engage opening 176 at the junction of the fins 170. The fastener 174 can be used to achieve alignment of the headlamp assembly 160 with respect to the mounting bracket 38 in a manner similar to that previously described.

If desired, a second fastener (not shown) can be caused to engage a second opening 178 in housing 168 to reduce any tendency toward vibration or impact induced misalignment. The second fastener can employ a second washer similar to washer 95 or can employ an oblong, cupped, saddle-shaped washer 175 shown in FIG. 8a coupling both fasteners. The washer 175 can be used in other similar situations to increase the coupling force between the nested spherical surfaces to ensure retention of the desired alignment of a headlamp.

It is to be noted that in each of the embodiments illustrated, the complete alignment of the headlamp with respect to the mounting bracket is achieved through a manual manipulation of the headlamp causing a pair of nested spherical surfaces to slidably move with respect to each other until the desired alignment direction is achieved. When the desired alignment is achieved, the tightening of a single fastener cooperatively engages the nested pair of spherical surfaces together thereby freezing their relative motion. While additional fasteners may be provided, the additional fasteners have the sole function of merely preventing any unwanted loosening of the central alignment fastener due to vibration, road shock, or the like.

As indicated previously in connection with FIG. 3, the housing bracket 38 can perform the added function of retaining a light source 30 within the housing 32. A detail of an alternate structure is shown in FIG. 9 wherein housing bracket 38 includes an opening 180 adapted to receive light socket 182 which in turn holds light source 30 situated in front of the reflective surface 26 of housing 32. The opening 180 is formed to include fingers 194 which engage outwardly projecting tab portions 196 of socket 182 in a conventional manner following insertion of the socket 182 and rotation thereof relative to the housing bracket 38 through an angle of about 60°. The fingers can be formed to permit either clockwise or counter-clockwise rotation to the locked position.

A separate flange member 84 is spot-welded or otherwise secured to housing bracket 38 and includes a central opening defined by inner lip 184 which sealingly engages O-ring 186 conventionally provided on bulb sockets such as socket 182. The inner lip 184 is shown to be spaced a small distance from the inner edge of opening 183 in housing 32. This spacing permits some adjustment in location of bulb 30 with respect to reflective surface 26 during initial manufacture of the headlamp. The flange 84 further has a formed ring 188 which acts to depress gasket 190 into a sealing engagement in groove 192 provided on the back surface of housing 32. The force necessary to ensure a sealing compression relationship between ring 188, gasket 190, and sealing groove 192 can be provided by the spring action of bubbles 82 in the forwardly extending legs 56 and 62 coupling the housing bracket 38 to the housing 32 and lens 22 as illustrated in FIGS. 2 and 3.

Figure 10:
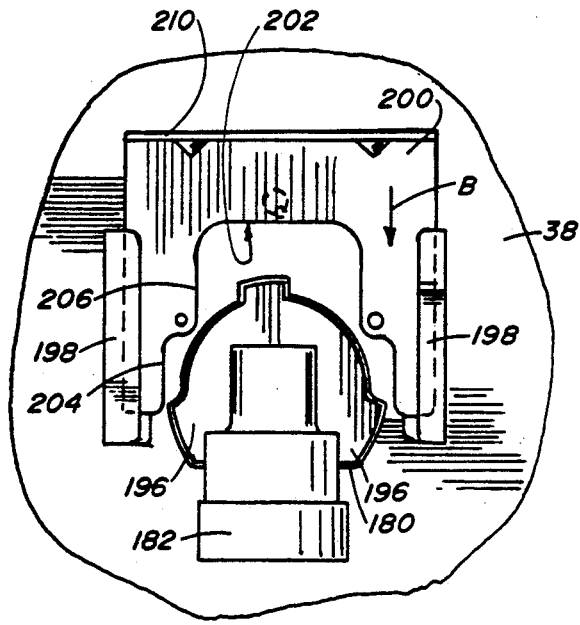
FIG. 10 is a rear elevation view of a housing bracket including an alternate illumination source receiving feature in accordance with the present invention in an "open" position.
Figure 11:
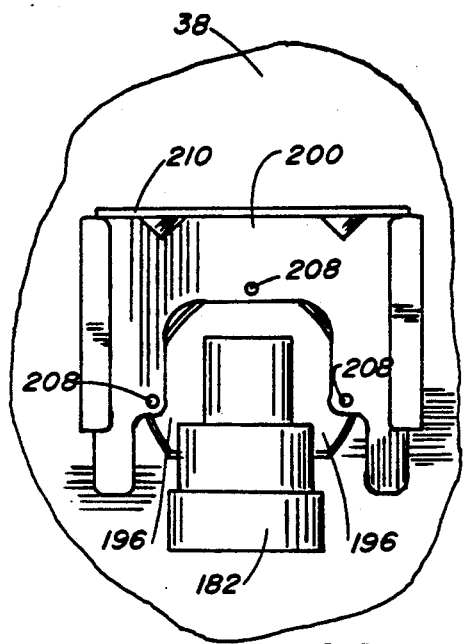
FIG. 11 is a rear elevation view similar to FIG. 10 with the alternate illumination source receiving feature in a "closed" position.

An alternative embodiment for such a light source retaining means is shown in FIGS. 10 and 11 wherein the housing bracket 38 is formed to include opening 180 adapted to receive socket 182 as shown previously, but is also formed to include a pair of linear tabs 198 positioned on opposite sides of the opening 180 to define a channel for receiving separately formed slide member 200. This slide member 200 includes an inner edge 202 which is formed to include both a wider portion 204 and a narrower portion 206. With the slide 200 in a raised position as shown in FIG. 10, the socket 182 can be slipped into opening 180 through the wide portion 204 of the slide 200. The slide 200 is then moved downward in the direction of arrow B to the position shown in FIG. 11 where the narrow portion 206 overlies the tabs 196 of socket 182. Three stamp-formed dimples 208 in slide 200 bias the socket 182 into engagement with the housing. The slide 200 can include a projecting tab edge 210 to assist in achieving the desired vertical movement of the slide 200 with respect to the housing bracket 38.

Figure 12:
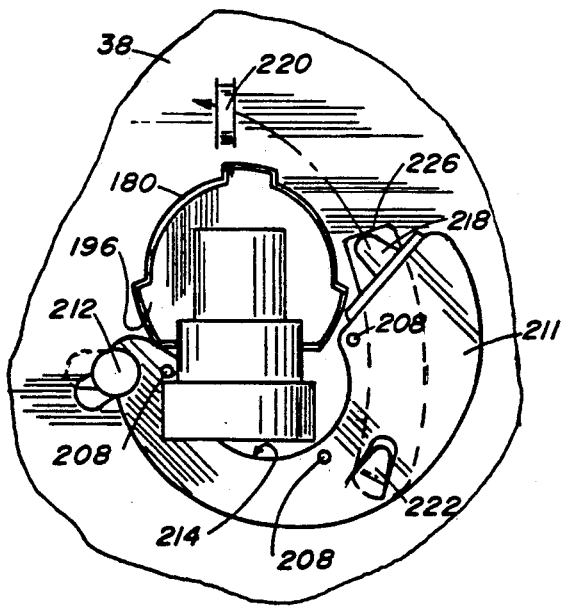
FIG. 12 is a rear elevation view of a housing bracket including a second alternate illumination source receiving feature in accordance with the present invention in an "open" position.
Figure 13:
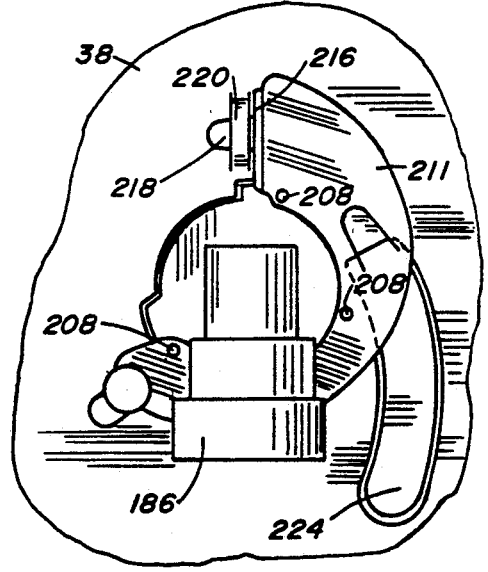
FIG. 13 is a rear elevation view similar to FIG. 12 with the second alternate illumination source receiving feature in a "closed" position.

Yet another form of light source retaining means is shown in FIGS. 12 and 13 wherein housing bracket 38 includes a pivot member 211 fixed for rotation adjacent to opening 180 by a rivet or other pivot defining means 212. The pivot member 211 includes a curved inner surface 214 including a plurality of dimples 208 which ride on the outer surface of bracket 38 when the pivot member is positioned adjacent opening 180 as shown in FIG. 12. The pivot member 211 also includes an upstanding flange 216 which can be grasped to move the pivot member 211 from the position shown in FIG. 12 to that shown in FIG. 13 so that the dimples 208 adjacent to the curved inner edge 214 now overlie tabs 196 on the socket 186 thereby depressing the socket 186 into opening 180 and into engagement with the lamp housing. A leading prong 218 on pivot member 210 passes beneath stamp formed slot 220 on housing bracket 38 while intermediate prong 222 traveling in grove 224 passes beneath ledge 226 thereby biasing the dimples 208 against the tabs 196 on the socket 186.

It will be appreciated that each of the embodiments shown in FIGS. 10-13 can also include the sealing features of lips 184 and depression rings 188 as illustrated in FIG. 9, if necessary, to achieve the appropriate seal necessary for the composite lamp assembly. It will further be appreciated that while the lamp retaining means illustrated in FIGS. 9-13 have particular utility in the environment shown in FIG. 3, such lamp retaining features can be used in other environments including more conventional lamp assemblies not employing the alignment features previously described.

Although the invention has been described in detail with reference to certain illustrated preferred embodiments, variations and modifications exist within the scope and spirit of the invention as described and as defined in the following claims.

What is claimed is:

1. A motor vehicle headlamp assembly comprising:
 a housing including an interior reflective surface bounded by an edge defining a perimeter,
 a lens mounted to the perimeter edge of the housing,
 a housing bracket coupled to the housing having an outside surface including at least one spherical segment having a defining radius centered on a point situated forward of the reflective surface,
 a mounting bracket having an inside surface contiguous to the at least one spherical segment for spherical positioning over a range of relative sliding movement with respect to the housing bracket, and
 fixing means for releasably fixing the position of the housing bracket with respect to the mounting bracket at any selected position within the range of movement to permit redirection of the light emitted from the assembly in any selected direction.

2. The motor vehicle headlamp assembly of claim 1 wherein the housing comprises a unitary molded body having at least one parabolic portion and forwardly direct wall portions extending from the parabolic portion to the perimeter edge.

3. The motor vehicle headlamp assembly of claim 2 wherein the housing further includes a plurality of vent openings in the wall portions and vent channels integral with the wall portions extending rearwardly from the vent openings.

4. The motor vehicle headlamp assembly of claim 2 wherein the housing further includes at least one opening in the parabolic portion for receiving a light bulb assembly.

5. The motor vehicle headlamp assembly of claim 1 further comprising seal means situated between the housing perimeter edge and the lens for sealing the headlamp.

6. The motor vehicle headlamp assembly of claim 1 wherein the housing bracket comprises a first portion contacting a back surface of the housing and coupling means for coupling the housing bracket to the housing.

7. The motor vehicle headlamp assembly of claim 1 wherein the mounting bracket further comprises means for mounting the assembly to the motor vehicle.

8. The motor vehicle headlamp assembly of claim 1 wherein the fixing means comprises threaded fastening means passing through an opening in the mounting bracket defining said range of relative movement and engaging the housing bracket for fastening the mounting bracket and housing bracket together at any selected position.

9. The motor vehicle headlamp assembly of claim 8 wherein the threaded fastening means comprises at least one threaded fastener passing through at least one opening in the mounting bracket, which at least one opening defines a range of adjustment of the housing bracket with respect to the mounting bracket, each threaded fastener being surrounded by a spherical washer engaging one of the spherical segments of the mounting bracket for fastening the mounting bracket and housing bracket together at any selected adjusted position.

10. The motor vehicle headlamp assembly of claim 9 wherein the housing bracket includes a nut stamp-formed from a portion thereof and folded to lie parallel thereto including key-hole shaped openings engaged by the threaded fastener.

11. A motor vehicle headlamp assembly comprising:
a housing including an interior reflective surface bounded by an edge defining a perimeter,
a lens mounted to the perimeter edge of the housing,
a housing bracket comprising a first portion contacting a back surface of the housing, coupling means for coupling the housing bracket to the housing, a plurality of forwardly extending legs having lens engaging means for engaging an edge of the lens to retain the lens against the perimeter edge of the housing, and an outside surface including at least one spherical segment having a defining radius centered on a point situated forward of the reflective surface,
a mounting bracket having an inside surface contiguous to the at least one spherical segment for spherical positioning over a range of relative sliding movement with respect to the housing bracket, and
fixing means for releasably fixing the position of the housing bracket with respect to the mounting bracket at any selected position within the range of movement to permit redirection of the light emitted from the assembly in any selected direction.

12. The motor vehicle headlamp assembly of claim 11 wherein the housing bracket forwardly extending legs further comprises length adjusting means for adjusting the length of the forwardly extending legs to permit engagement and disengagement of the lens engaging means.

13. The motor vehicle headlamp assembly of claim 12 wherein the length adjusting means comprises an outwardly extending bubble integral with each leg and adapted to be displaced toward the housing to adjust the length of the leg and the position of the lens engaging means.

14. A motor vehicle headlamp assembly comprising:
a housing comprising a unitary molded body having at least one parabolic portion including an interior reflective surface and forwardly directed wall portions extending from the parabolic portion to a perimeter edge,
a lens mounted to the perimeter edge of the housing,
a plurality of vent openings in the wall portions,
and a vent channel integral with the wall portions extending rearwardly from each vent opening, each of the vent openings comprises a notch immediately adjacent to the perimeter edge and intersecting each vent channel.

15. The motor vehicle headlamp assembly of claim 14 wherein the housing further includes at least one opening in the parabolic portion for receiving a light bulb assembly.

16. The motor vehicle headlamp assembly of claim 14 further comprising seal means situated between the housing perimeter edge and the lens for sealing the headlamp.

17. The motor vehicle headlamp assembly of claim 14 wherein the vent channel comprises a rearwardly opening tapered horn having a smaller cross-section end adjacent to the perimeter edge and intersecting a vent opening, and a larger cross-section end adjacent to the parabolic portion.

18. A motor vehicle headlamp assembly comprising:
a headlamp including a light source comprising socket means for receiving a bulb, and a reflector bounded by an edge defining a perimeter.
surface defining means fixed to a rear surface of the headlamp defining a set of points having a common radius centered on a point situated forward of the reflector, and a central opening defined by an inner lip which sealingly engages an outer perimeter of the socket means for positioning the light source within the reflector,
fixture means adapted to be mounted to a motor vehicle having a surface contiguous to the surface defining means for adjustment with respect thereto including an opening, and
fixing means passing through said opening and spherically movable with respect to the fixture means within a range defined by the opening for fixing the position of the surface defining means with respect to the fixture means to direct light emitted from the headlamp in a selected direction.

19. The motor vehicle headlamp assembly of claim 18 wherein the light source retaining means comprises means surrounding the inner lip for depressing a gasket into sealing engagement with a back surface of the reflector.

20. The motor vehicle headlamp assembly of claim 18 wherein the inner lip of the light source retaining means is spaced from the reflector by a distance permitting an adjustment in location of bulb with respect to reflective surface.

21. A motor vehicle headlamp assembly comprising:
a headlamp including a light source comprising socket means for receiving a bulb, and a reflector bounded by an edge defining a perimeter,
surface defining means fixed to a rear surface of the headlamp defining a set of points having a common radius centered on a point situated forward of the reflector, and a light source retaining means including a releasably locking means contacting a back surface of the socket means for releasably locking the socket means in position relative to the reflector to permit replacement of said bulb,
fixture means adapted to be mounted to a motor vehicle having a surface contiguous to the surface defining means for adjustment with respect thereto including an opening, and
fixing means passing through said opening and spherically movable with respect to the fixture means within a range defined by the opening for releasably fixing the position of the surface defining means with respect to the fixture means to permit the redirection of light emitted from the headlamp in any selected direction.

22. The motor vehicle headlamp assembly of claim 21 wherein the locking means comprises a plurality of fingers engaging outwardly projecting tab portions of the socket means following insertion of the socket means and rotation thereof relative to the fingers.

23. The motor vehicle headlamp assembly of claim 21 wherein the locking means comprises a plate movable with respect to the surface defining means including a plurality of protrusions for engaging outwardly projecting tab portions of the socket means.

24. The motor vehicle headlamp assembly of claim 23 wherein the plate is slidably movable with respect to the surface defining means.

25. The motor vehicle headlamp assembly of claim 23 wherein the plate is pivotally movable with respect to the surface defining means.

26. A motor vehicle headlamp assembly comprising:
a housing including an interior reflective surface bounded by an edge defining a perimeter,
a lens mounted to the perimeter edge of the housing,
a housing bracket coupled to the housing having an outside surface including at least one spherical segment having a defining radius centered on a point situated forward of the reflective surface, a first portion contacting a back surface of the housing, coupling means for coupling the housing bracket to the housing, and a plurality of forwardly extending legs having lens engaging means for engaging an edge of the lens to retain the lens against the perimeter edge of the housing,
a mounting bracket having an inside surface contiguous to the at least one spherical segment for spherical positioning movement with respect to the housing bracket, and
fixing means for fixing the position of the housing bracket with respect to the mounting bracket to direct light emitted from the assembly in a selected direction.

27. A motor vehicle headlamp assembly comprising:
a headlamp including a light source and a reflector on a rear surface bounded by an edge defining a perimeter,
surface defining means fixed with respect to the rear surface of the headlamp for defining a set of points having a common radius centered on a point situated forward of the reflector,
fixture means adapted to be mounted to a motor vehicle having a surface contiguous to the surface defining means for slidable adjustment with respect to the surface defining means, the fixture means including opening means defining a range of permitted relative slidable movement between the surface defining means and the fixture means, and
fixing means passing through said opening means in the fixture means and selectively positionable within said range of permitted relative movement defined by the opening means for releasably fixing the position of the surface defining means with respect to the fixture means to permit redirection of light emitted from the headlamp in any selected direction.

28. The motor vehicle headlamp assembly of claim 27 wherein the headlamp including a light source and reflector comprises a sealed light capsule including a lens and wherein the surface defining means comprises a bracket coupled to the sealed light capsule, the bracket having an outside surface including at least one spherical segment having a defining radius centered on a point situated forward of the reflector.

29. The motor vehicle headlamp assembly of claim 28 further comprising a ring surrounding the perimeter edge of the lens and a plurality of spring means extending forward from said bracket to contact the rear surface of the sealed light capsule for biasing the sealed capsule toward the ring.

30. The motor vehicle headlamp assembly of claim 29 wherein the rig further includes hinge means for pivotally coupling the ring to the capsule housing and catch means located on the capsule housing opposite the hinge means for snap coupling the ring to the capsule housing.

31. The motor vehicle headlamp assembly of claim 27 wherein the headlamp including the light source and reflector comprises a housing including an interior reflective surface bounded by an edge defining a perimeter, and a separate lens mounted to the perimeter edge of the housing.

32. The motor vehicle headlamp assembly of claim 31 wherein said surface defining means comprises web means integrally formed on a rearward surface of the housing and having arcuate outer surfaces for defining said set of points having a common radius centered on a point situated forward of the reflector.

33. The motor vehicle headlamp assembly of claim 32 wherein said fixture means comprises a mounting bracket having a spherical segment, and the fixing means comprises a rearwardly extending projection unitary with the housing passing through the housing bracket and the mounting bracket, and engaging means engaging the rearwardly extending projection for exerting a force on said spherical segments.

34. The motor vehicle headlamp assembly of claim 33 wherein the rearwardly extending projection unitary with the housing includes means defining a stop abutting an edge of the housing bracket, and a plurality of flutes adapted to be engaged by the engaging means.

35. The motor vehicle headlamp assembly of claim 34 wherein the engaging means comprises a nut including a plurality of teeth adapted to cut a threaded path in the plurality of flutes.

36. The motor vehicle headlamp assembly of claim 35 wherein the nut further comprises tab means for insertion between any two adjacent flutes on the rearwardly extending projection to prevent rotation of the nut relative to the rearwardly extending projection.

37. The motor vehicle headlamp assembly of claim 31 wherein said surface defining means comprises a housing bracket coupled to the housing having an outside surface including at least one spherical segment having a defining radius centered on a point situated forward of the reflective surface.

38. The motor vehicle headlamp assembly of claim 37 wherein said fixing means comprises at least one threaded fastener passing through at least one opening in the housing bracket, which at least one opening defines a range of adjustment of the housing bracket with respect to the mounting bracket, each threaded fastener being surrounded by a spherical washer engaging one of the spherical segments of the mounting bracket for fastening the mounting bracket and housing bracket together at any selected adjusted position.

39. The motor vehicle headlamp assembly of claim 37 wherein the fixing means comprises at least one threaded fastener passing through an opening in the mounting bracket, which opening defined a range of adjustment of the housing bracket with respect tot he mounting bracket, each threaded fastener being surrounded by a spherical washer engaging one of the spherical segments of the housing bracket for fastening the mounting bracket and housing bracket together at a selected adjusted position.

40. The motor vehicle headlamp assembly of claim 39 wherein the housing bracket includes a nut stamp-formed from a portion thereof and folded to lie parallel thereto including a key-hole shaped openings engaged by the threaded fastener.

* * * * *